United States Patent
Greenberg et al.

(10) Patent No.: US 10,384,786 B2
(45) Date of Patent: Aug. 20, 2019

(54) THERMALLY BIASED VALVE AND ANTI-ICING SYSTEM

(71) Applicant: United Technologies Corporation, Hartford, CT (US)

(72) Inventors: Michael D. Greenberg, Bloomfield, CT (US); Zhijun David Zheng, Avon, CT (US); Robert Goodman, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 797 days.

(21) Appl. No.: 15/017,159

(22) Filed: Feb. 5, 2016

(65) Prior Publication Data
US 2017/0225791 A1 Aug. 10, 2017

(51) Int. Cl.
| | |
|---|---|
| *B64D 15/04* | (2006.01) |
| *F02C 7/047* | (2006.01) |
| *F16K 17/00* | (2006.01) |
| *F01D 17/08* | (2006.01) |
| *G05D 7/01* | (2006.01) |
| *B64D 33/02* | (2006.01) |

(52) U.S. Cl.
CPC ........... *B64D 15/04* (2013.01); *F01D 17/085* (2013.01); *F02C 7/047* (2013.01); *F16K 17/003* (2013.01); *G05D 7/01* (2013.01); *B64D 2033/0233* (2013.01); *F05D 2270/313* (2013.01); *F05D 2300/50212* (2013.01)

(58) Field of Classification Search
CPC .................... B64D 15/04; B64D 13/08; B64D 2013/0644; B64D 2013/0618; Y02T 50/56
See application file for complete search history.

(56) References Cited

U.S. PATENT DOCUMENTS

| | | | |
|---|---|---|---|
| 3,741,610 | A | 6/1973 | Holland |
| 4,106,510 | A | 8/1978 | Hakim et al. |
| 4,249,695 | A | 2/1981 | Dreibelbis |
| 4,318,070 | A | 3/1982 | Dohrmann et al. |
| 4,358,925 | A | 11/1982 | Williams |

(Continued)

FOREIGN PATENT DOCUMENTS

| | | |
|---|---|---|
| EP | 0106781 A1 | 4/1984 |
| GB | 1345351 | 1/1974 |

(Continued)

OTHER PUBLICATIONS

"Lecture 33", Dec. 3, 2015, https://www4.uwsp.edu/physastr/kmenning/Phys203/Lect33.html, p. 8 (Year: 2015).*

(Continued)

*Primary Examiner* — Brian M O'Hara
(74) *Attorney, Agent, or Firm* — Kinney & Lange, P.A.

(57) ABSTRACT

A valve includes an inlet, an outlet, and a biasing element. The biasing element includes a first spring element, a second spring element, and a valve element. The second spring element includes at least one bimetallic disk including a first and second material. The first material includes a first coefficient of linear thermal expansion, and the second material includes a second coefficient of linear thermal expansion different than the first coefficient of linear thermal expansion. The valve element disposed on an end of the first spring element.

6 Claims, 4 Drawing Sheets

(56) References Cited

U.S. PATENT DOCUMENTS

| | | | |
|---|---|---|---|
| 4,473,999 A | | 10/1984 | Smith |
| 4,688,745 A | | 8/1987 | Rosenthal |
| 5,156,332 A | * | 10/1992 | Dyer .................. G05D 7/0126 |
| | | | 137/468 |
| 5,257,498 A | | 11/1993 | Nikkanen et al. |
| 7,131,612 B2 | | 11/2006 | Baptist et al. |
| 7,780,117 B2 | | 8/2010 | Botura et al. |
| 7,909,261 B2 | | 3/2011 | Ellstrom et al. |
| 7,959,109 B2 | | 6/2011 | Dasilva et al. |
| 8,572,985 B2 | | 11/2013 | Waddleton |
| 9,169,779 B2 | | 10/2015 | Winter |
| 2010/0154987 A1 | | 6/2010 | Vontell, Sr. |
| 2015/0034767 A1 | * | 2/2015 | Pirat .................. B64D 15/04 |
| | | | 244/134 B |

FOREIGN PATENT DOCUMENTS

| WO | WO9935385 A1 | 7/1999 |
|---|---|---|
| WO | WO2015130384 A2 | 9/2015 |

OTHER PUBLICATIONS

Pressure-Compensated Flow Control Valves, website <http://www.valvehydraulic.info/creation-and-control-of-fluid-flow/pressure-compensated-flow-control-valves.html>, 3 pages, visited Feb. 4, 2016.

Parker, TPC Pressure, Temperature Compensated Flow Control Valve, website <(b) http://www.parker.com/portal/site/PARKER/menuitem.de7b26ee6a659c147cf26710237ad1ca/?vgnextoid=fcc9b5bbec622110VgnVCM10000032a71dacRCRD&vgnextchannel=fcc9b5bbec622110VgnVCM10000032a71dacRCRD&vgnextfmt=default&vgnextdiv=687505&vgnextcatid=1537967&vgnextcat=TPC+PRESSURE%2C+TEMPERATURE+COMPENSATED+FLOW+CONTROL+VALVE&Wtky=>, 4 pages, visited Feb. 4, 2016.

Extended European Search Report for EP Application No. 17154687.2, dated Jun. 23, 2017, 10 Pages.

* cited by examiner

THERMALLY BIASED VALVE AND ANTI-ICING SYSTEM

BACKGROUND

The present disclosure relates generally to pressure regulation systems, and more particularly to thermally responsive pressure valves used in anti-icing systems for aircraft.

Operation of aircraft engines in adverse weather conditions or at high altitudes can sometimes lead to ice forming on the exposed surfaces of the engine nacelle inlet. The build-up of ice on a nacelle surrounding the engine limits the quantity of air being fed to the engine. This reduction in inlet airflow can result in a reduction of power output, efficiency and/or cooling capacity of the engine. Engine inlet anti-icing systems commonly employ a thermal source, such as hot air bled from the engine core, which is applied to the nacelle inlet to prevent ice build-up on the external surfaces thereof.

Another concern with aircraft engines is the useful life of the aircraft engine and components. The build-up of ice near the inlet of the engine may lead to large pieces of ice breaking loose from the inlet and flowing into the gas turbine engine. Ice flowing into and through the engine may damage components within the engine, such as the blades, and components attached to the nacelle, such as inlet acoustic panels. The damaged components may then require repair or replacement.

Current anti-icing systems include valves that do not compensate for increases in bleed air temperature with increasing bleed pressure and as a result, delivered heat flux which is a function of flow times bleed air temperature can result in damage to the nacelle.

SUMMARY

A valve includes an inlet, an outlet, and a biasing element. The biasing element includes a first spring element, a second spring element, and a valve element. The second spring element includes at least one bimetallic disk including a first and second material. The first material includes a first coefficient of linear thermal expansion, and the second material includes a second coefficient of linear thermal expansion different than the first coefficient of linear thermal expansion. The valve element is disposed on an end of the first spring element.

A method of adjusting a valve includes directing a fluid into a first valve. Fluid is passed over a biasing element in the first valve. Thermal energy is transferred either from the fluid to at least one bimetallic disk of the biasing element or to the fluid from the at least one bimetallic disk. The curvature of the at least one bimetallic disk is altered in response to a change in temperature of the fluid. A spring force of the biasing element is changed as a function of the altered curvature of the at least one bimetallic disk. A pressure of the fluid exiting the first valve is changed as a function of the changed spring force of the biasing element.

A fluid pressure regulation system includes a first valve, second valve, and an anti-icing system for a nacelle inlet of an aircraft engine. The first valve includes an inlet, an outlet, and a biasing element. The biasing element includes a first spring element, a second spring element, and a valve element. The second spring element includes at least one curved bimetallic disk including first and second metallic materials. The first metallic material is on a concave side of the at least one curved bimetallic disk. The second metallic material is on a convex side of the at least one curved bimetallic disk. The valve element is disposed on an end of the first spring element. The anti-icing system is fluidly connected to the second valve.

The present summary is provided only by way of example, and not limitation. Other aspects of the present disclosure will be appreciated in view of the entirety of the present disclosure, including the entire text, claims and accompanying figures.

Figure 1:
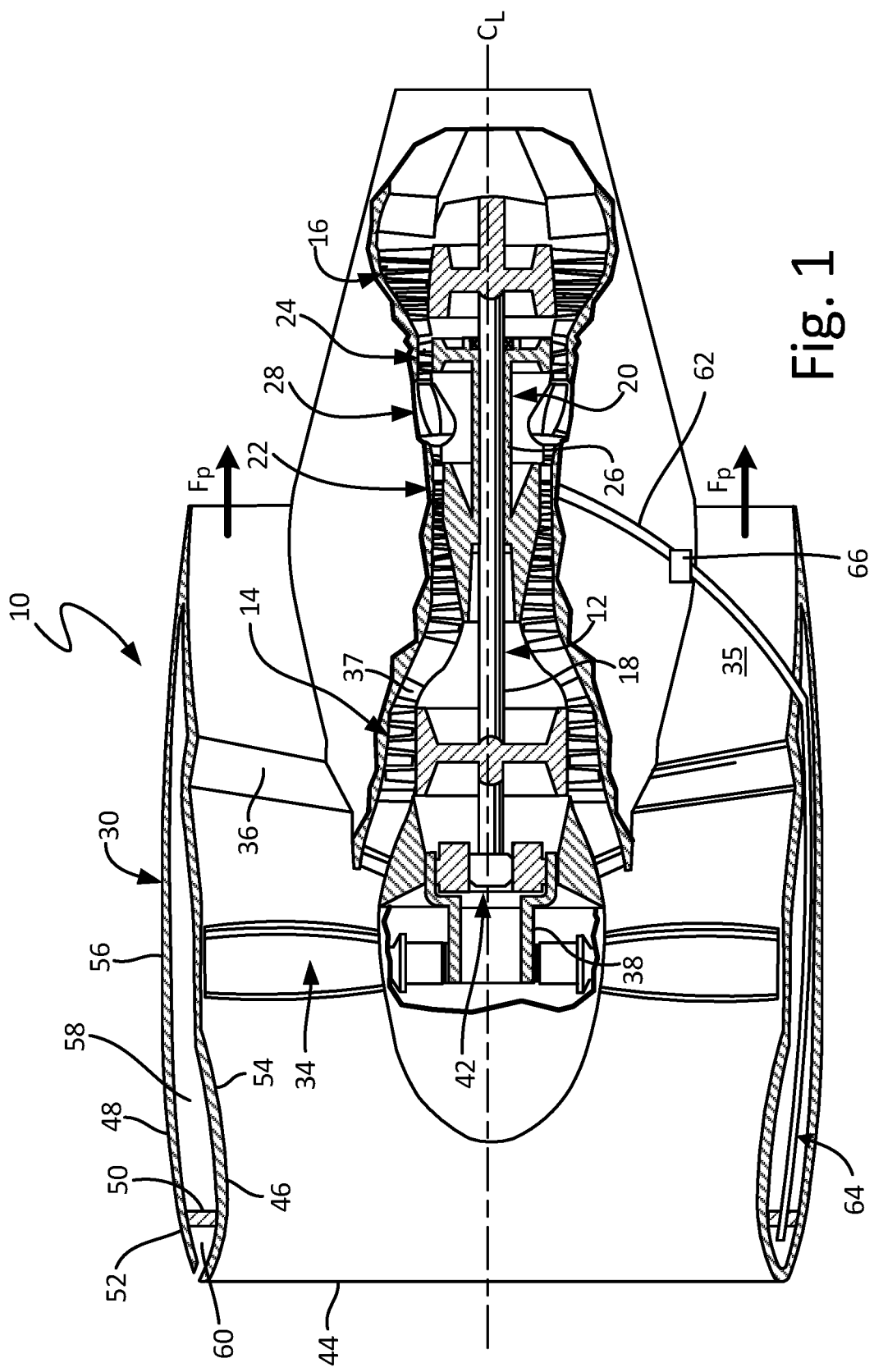
FIG. 1 is a cross-sectional view of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

FIG. 1 is a cross-sectional view of gas turbine engine 10, in a two-spool turbofan configuration for use as a propulsion engine on an aircraft. As shown in the figure, low spool 12 includes low pressure compressor ("LPC") 14 and low pressure turbine ("LPT") 16, rotationally coupled via low pressure shaft 18. High spool 20 includes high pressure compressor ("HPC") 22 and high pressure turbine ("HPT") 24, rotationally coupled via high pressure shaft 26. High spool 20 is coaxially oriented about low spool 12, along engine centerline (or turbine axis) $C_L$, with combustor 28 positioned in flow series between high pressure compressor 22 and high pressure turbine 24.

Nacelle 30 is oriented about the forward end of gas turbine engine 10. Fan casing 32 extends along on the radially inner surface of nacelle 30, from propulsion fan 34 to fan exit guide vane 36. Propulsion fan 34 is rotationally coupled to low spool 12 via fan shaft 38, generating propulsive flow Fp through fan duct (or bypass duct) 40. In advanced engine designs, fan drive gear system 42 couples fan shaft 38 to low spool 12 at low pressure shaft 18, providing independent fan speed control for reduced noise and improved operating efficiency.

Nacelle 30 extends forward of the gas turbine engine 10 and defines inlet 44 for incoming fluid. Nacelle 30 includes inner barrel 46, outer barrel 48, bulkhead 50, and inlet shell 52. Inner barrel 46 defines radially outer flow surface 54 for a portion of the flowpath of gas turbine engine 10. Outer barrel 48 defines outer flow surface 56 for the external medium flowing about gas turbine engine 10. A radial separation between inner barrel 46 and outer barrel 48 defines annular chamber 58 there between. Inlet shell 52 is the leading edge for nacelle 30. Inlet shell 52 and bulkhead 50 bound annular shell cavity 60.

Fluid pressure regulation system 62 is fluidly connected to HPC 22 and extends into annular chamber 48. Anti-icing system 64 is positioned within nacelle 30 and transfers fluid, in this example bleed air, into annular shell cavity 52. Fluid pressure regulation system 62 includes valve assembly 66 which can include a variety of valves and flow regulators to control the flow of bleed air through fluid pressure regulation system 62 (as will be discussed with respect to the remaining figures).

Figure 2:
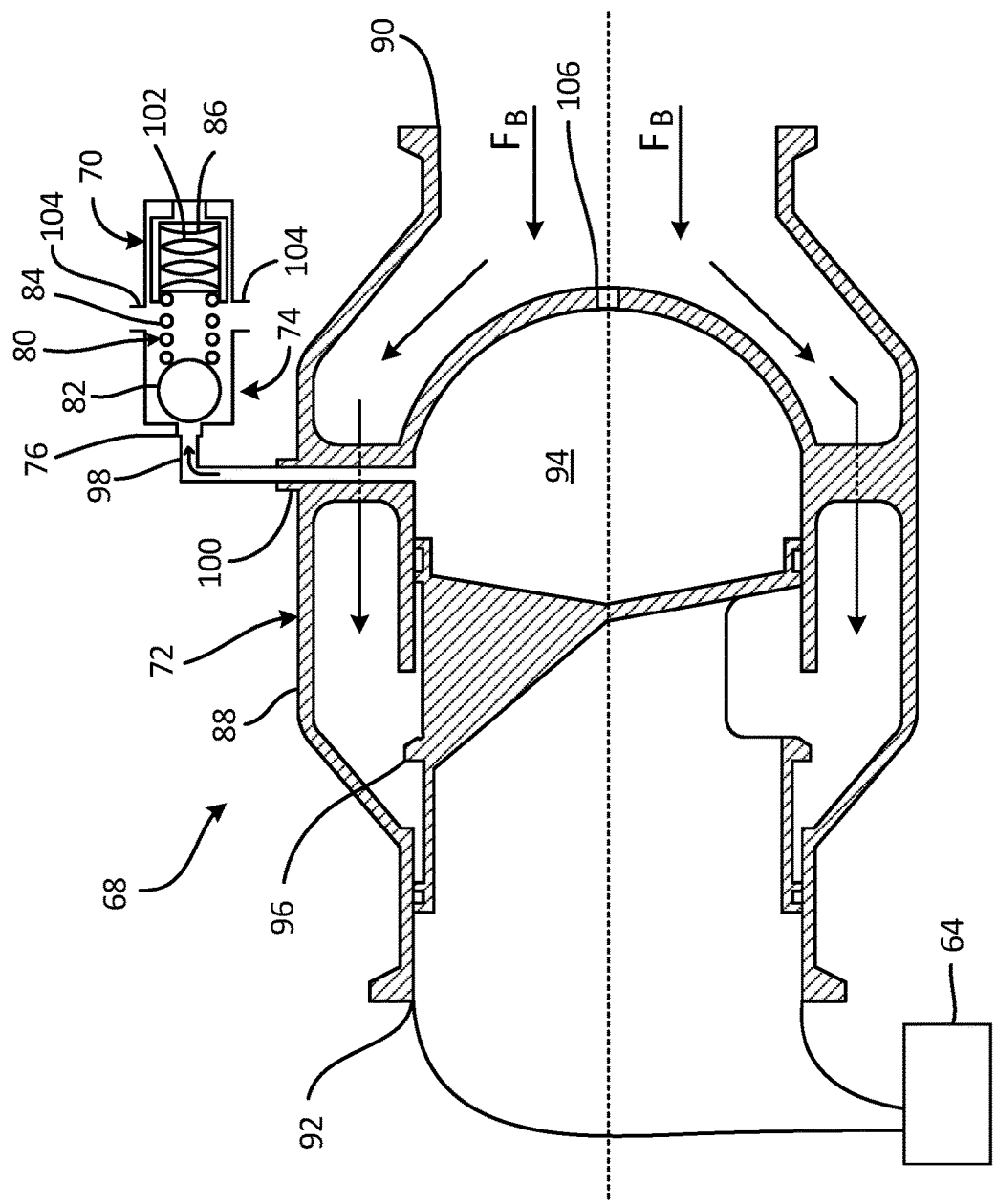
FIG. 2 is a cross-sectional view of a direct acting pressure regulation valve.

FIG. 2 is a cross-sectional view of pressure regulation system 68. Pressure regulation system 68 includes first valve 70 and second valve 72. First valve 70 includes housing 74 with inlet 76 and ports 104. First valve 70 contains biasing element 80 and valve element 82. Biasing element 80 includes first spring element 84 and second spring element 86. First spring element 84 can be a coil spring or another suitable biasing member. Second spring element 86 can be made up of one or more bimetallic disks 102. First valve 70 also includes port 104 to transport fluid from inside first valve 70 to an ambient environment outside of first valve 70.

Second valve 72 includes housing 88, inlet 90, outlet 92, internal chamber 94, and valve element 96. Inlet 90 provides an opening through which flow $F_B$ enters into second valve 72, while outlet 92 provides an opening through which flow $F_B$ exits second valve 72. Internal chamber 94 includes chamber inlet 106 and contains valve element 96. Second valve 72 is configured such that as a pressure inside of internal chamber 94 changes, valve element 96 actuates along a linear pathway in response the change in pressure in internal chamber 94. The positioning of valve element 96 regulates an amount of flow $F_B$ exiting from outlet 92 by controlling an effective area that flow $F_B$ passes through as it travels through second valve 72, past valve element 96, and through outlet 92.

First valve 70 and second valve 72 are fluidly connected by line 98. Line 98 can be a single passage that fluidly connects port 100 of housing 88 with inlet 76 of first valve 70. During operation of pressure regulation system 68, a portion of flow $F_B$ of the fluid flowing through second valve 72 is diverted through line 98 and into first valve 70. As flow $F_B$ enters first valve 70, biasing element 80 regulates the amount of flow $F_B$ that enters into first valve 70. As flow $F_B$ flows through first valve 70, flow $F_B$ flows through ports 104, out of first valve 70, and into an ambient environment outside of first valve 70 (and outside of second valve 72).

Before operation of gas turbine engine 10 begins, a curvature of bimetallic disks 102 is set to provide a desired compressive force onto bimetallic disks 102. During engine operation, flow $F_B$ of the engine bleed air is directed into first valve 70 and passed over biasing element 80 and bimetallic disks 102. As flow $F_B$ of the bleed air is passed over second spring element 86, thermal energy is transferred to bimetallic disks 102. As thermal energy is transferred to bimetallic disks 102, the curvature of bimetallic disks 102 is altered, and in this example the curvature of bimetallic disks 102 is reduced which decreases the height of second spring element 86, causing a decrease in the compression force in biasing element 80. The decrease in compression force in biasing element 80 results in changing a pressure of flow $F_B$ exiting first valve 70 as a function of the changed spring force of biasing element 80, and in this example an increased pressure of flow $F_B$ exiting first valve 70. A higher amount of flow $F_B$ exiting first valve 70 adjusts second valve 72 in response to the increase in the rate of pressure of flow $F_B$ transferred from first valve 70. Specifically, adjusting second valve 72 includes actuating valve element 96 disposed within the second valve, which results in a reduction in the pressure of flow $F_B$ exiting out of outlet 92.

Another example of pressure regulation system 68 includes transferring thermal energy from bimetallic disks 102 to flow $F_B$. In such an example, as thermal energy is transferred from bimetallic disks 102, the curvature of bimetallic disks 102 is altered, and in this example the curvature of bimetallic disks 102 is increased which increases the height of second spring element 86 causing an increase in the compressive force in biasing element 80. The increase in height of second spring element 86 results in changing of pressure of flow $F_B$ exiting first valve 70 as a function of the changed spring force of biasing element 80, and in this example a decreased pressure of flow $F_B$ exiting first valve 70. A lower amount of flow $F_B$ exiting first valve 70 adjusts second valve 72 in response to the decrease in the pressure of flow $F_B$ transferred from first valve 70. Specifically, adjusting second valve 72 includes actuating valve element 96 disposed within the second valve, which results in an increase in the pressure of flow $F_B$ exiting out of outlet 92.

As flow $F_B$ through and out of first valve 70 is increased, the pressure inside of internal chamber 94 is decreased, and valve element 96 actuates to the right of FIG. 2 in response to the decrease in pressure inside internal chamber 94. As valve element 96 actuates to the right of FIG. 2, second valve 72 becomes more closed such that flow $F_B$ out of outlet 92 is decreased. As flow $F_B$ through and out of first valve 70 decreases, the volume of flow $F_B$ exiting out of internal chamber 94 decreases, which increases the amount of pressure in internal chamber 94. As the amount of pressure in internal chamber 94 increases, a linear force is applied to valve element 96 and valve element 96 actuates to the left of FIG. 2. As valve element 96 actuates to the left of FIG. 2, second valve 72 becomes more open, such that flow $F_B$ out of outlet 92 is increased. Pressure regulation system 68 is an example of an open-loop pressure regulation system with a direct-acting design which ports bleed air flow $F_B$ to an ambient environment after flow $F_B$ exits first valve 70.

Flow $F_B$ of the fluid is transferred from second valve 72 to nacelle 30, which includes anti-icing system 64, of gas turbine engine 10. Thermal energy is then transferred from flow $F_B$ to nacelle 30 through anti-icing system 64 and the build-up of ice on nacelle 30 is reduced in response to transferring thermal energy from flow $F_B$ to nacelle 30. For example, a lower pressure of flow $F_B$ exiting out of outlet 92 results in less flow $F_B$ of bleed air to anti-icing system 64 and a lower temperature of inlet 44 of nacelle 30.

Figure 3:
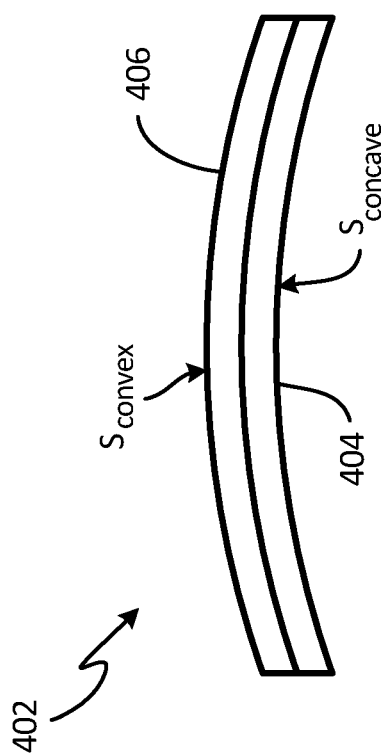
FIG. 3 is a cross-sectional view of a bimetallic disk.

FIG. 3 is a cross-sectional view of bimetallic disk 108. Bimetallic disk 108 includes first layer 110 on concave side $S_{concave}$ of bimetallic disk 108 and second layer 112 on convex side $S_{convex}$ of bimetallic disk 108. First layer 110 and second layer 112 are bonded together. Bimetallic disk 108 includes two layers, but can also include more or less layers. Additionally, first layer 110 and second layer 112 can include different curvatures, thicknesses, lengths, and sizes.

Bimetallic disk 108 includes one or more disks including two different materials each with a different coefficient of linear thermal expansion. A first material of first layer 110 includes a first alloy with a first rate of thermal expansion and a second material of second layer 112 includes a second alloy with a second rate of thermal expansion less than the first rate of thermal expansion of the first material. The materials and quantity of layers of bimetallic disk 108 can be selected to provide a tailorable spring constant for first valve 70 in FIG. 2.

Figure 4:
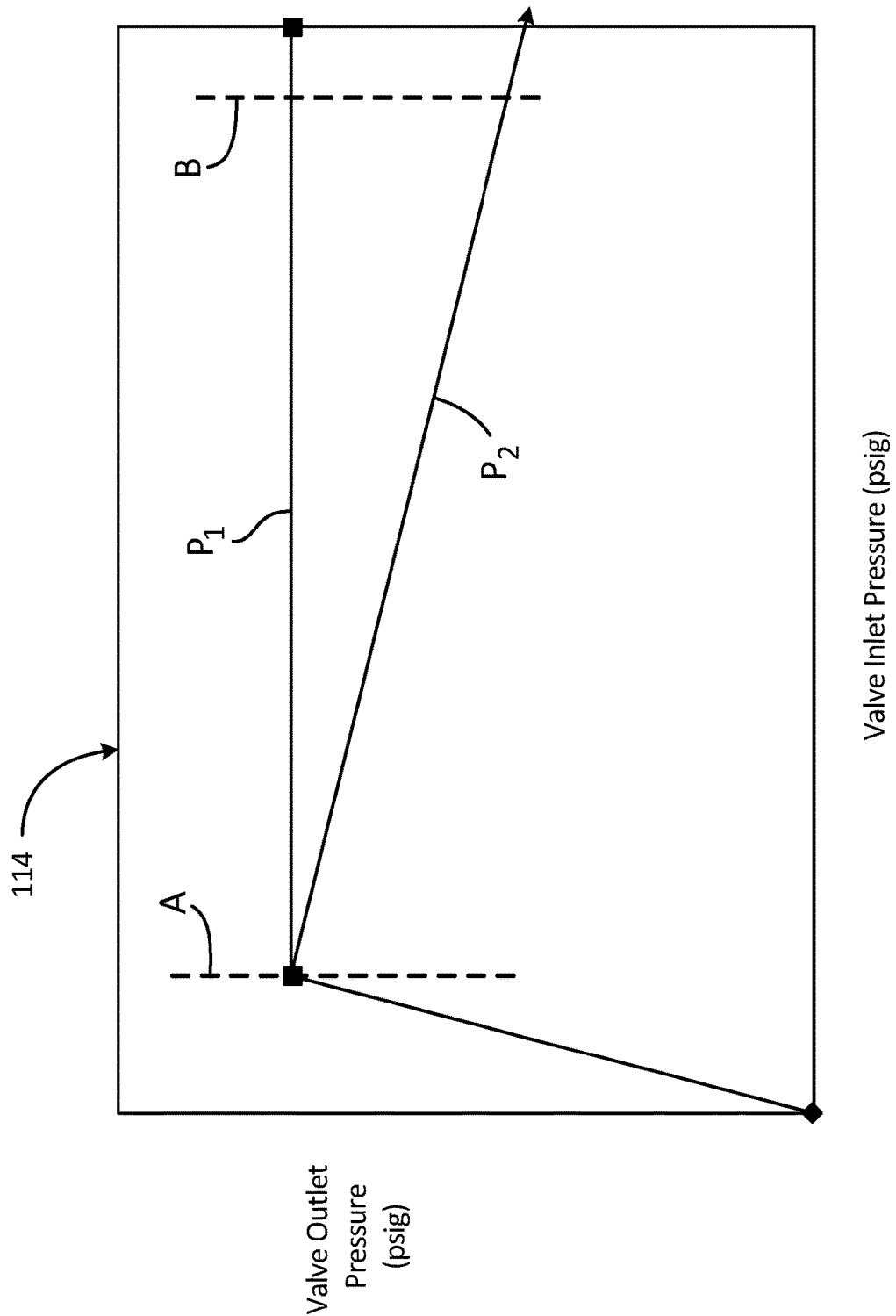
FIG. 4 is a graph of valve outlet pressure as a function of valve inlet pressure.

FIG. 4 shows graph 114 of valve outlet pressure as a function of valve inlet pressure of pressure regulation system 68 shown in FIG. 2. During engine operation, as the engine bleed air temperature increases, valve inlet pressure and valve outlet pressure increase until valve outlet pressure achieves regulation set-point A.

In a system without a temperature biased valve assembly, further increases to the valve inlet pressure result in a constant outlet pressure $P_1$ as indicated by the zero slope of the line between set-point A and set-point B. Without a reduction in valve outlet pressure $P_1$, the corresponding nacelle inlet temperature continues to increase as valve inlet pressure is increased between set-point A and set-point B potentially causing damage to the nacelle of a gas turbine engine that does not include a temperature biased bleed air assembly.

In a system with a temperature biased valve assembly, such as in pressure regulation system 68, once valve outlet pressure $P_2$ reaches set-point A, further increases to the valve inlet pressure result in a reduced valve outlet pressure $P_2$ as indicated by the negative slope of the line between set-point A and set-point B. With a reduction in valve outlet pressure $P_2$, causing a decrease in flow and reduced heat flux, the corresponding nacelle inlet temperature is maintained at a set value as valve inlet pressure is increased between set-point A and set-point B.

An example valve outlet pressure $P_2$ value for set-point A includes a pressure of approximately 45 psi (310 kpa) and an example for set-point B includes a pressure of approximately 30 psi (207 kpa). Example ranges for the axes of graph 114 include 0-350 psi (0-2,413 kpa) along the independent (e.g. horizontal axis) and 0-60 psi (0-414 kpa) along the dependent (e.g. vertical axis) with regards to valve outlet pressure. An example nacelle inlet temperature value at set-points A and B for $P_2$ include a temperature of approximately 400° F. (204° C.). A example range of nacelle inlet temperatures is 32°-800° F. (0°-427° C.) with regards to nacelle inlet temperature.

Additionally, as an example, the line segments representing valve outlet pressure $P_2$ can include varying slopes and/or curvilinear data points.

Discussion of Possible Embodiments

The following are non-exclusive descriptions of possible embodiments of the present invention.

A valve can include an inlet, an outlet, and/or a biasing element. The biasing element can include a first spring element, a second spring element, a plate, and a valve element. The second spring element can include at least one bimetallic disk which can include a first and second material. The first material can include a first coefficient of linear thermal expansion, and the second material can include a second coefficient of linear thermal expansion that can be different than the first coefficient of linear thermal expansion. The valve element can be disposed on an end of the first spring element.

The valve of the preceding paragraph can optionally include, additionally and/or alternatively, any one or more of the following features, configurations and/or additional components:

a further embodiment of the foregoing valve, wherein the first material is disposed on a concave side of each of the at least one bimetallic disk and the second material is disposed on the convex side of the at least one bimetallic disk;

a further embodiment of the foregoing valves, wherein the first coefficient of linear thermal expansion is greater than the second coefficient of linear thermal expansion;

a further embodiment of the foregoing valves, wherein the at least one bimetallic disk can include an adjustable curvature;

a further embodiment of the foregoing valves, wherein the valve includes at least one port to transport fluid from inside the valve to outside the valve;

a further embodiment of the foregoing valves, wherein the valve can be fluidly connected to a nacelle of a gas turbine engine;

a further embodiment of the foregoing valves, wherein the second spring element comprises a plurality of curved bimetallic disks; and/or a further embodiment of the foregoing valves, wherein the plurality of curved bimetallic disks comprise curved bimetallic disks facing in opposite directions.

A method of adjusting a valve can include directing a fluid into a first valve. Fluid can be passed over a biasing element in the first valve. Thermal energy can be transferred either from the fluid to at least one bimetallic disk of the biasing element or to the fluid from the at least one bimetallic disk. The curvature of the at least one bimetallic disk can be altered in response to a change in temperature of the fluid. A spring force of the biasing element can be changed as a function of the altered curvature of the at least one bimetallic disk. A pressure of the fluid exiting the first valve can be changed as a function of the changed spring force of the biasing element.

The method of the preceding paragraph can optionally include, additionally and/or alternatively, any one or more of the following features, configurations and/or additional components:

a further embodiment of the foregoing method can further comprise transferring thermal energy from the fluid to each of the bimetallic disks, decreasing the curvature of each of the bimetallic disks, decreasing the spring force of the biasing element, and increasing the pressure of the fluid exiting the first valve;

a further embodiment of the foregoing methods can further comprise transferring thermal energy to the fluid from each of the bimetallic disks, increasing the curvature of each of the bimetallic disks, increasing the spring force of the biasing element, and decreasing the pressure of the fluid exiting the first valve;

a further embodiment of the foregoing methods can further comprise transferring fluid from a second valve to the first valve, adjusting the second valve in response to the pressure of the fluid exiting the first valve, and altering a flow of the fluid out of the second valve as a function of the adjusted second valve;

a further embodiment of any of the foregoing methods, wherein adjusting the second valve can further comprise actuating a valve element disposed within the second valve;

a further embodiment of the foregoing methods can further comprise transferring fluid from the second valve to a nacelle of an aircraft engine, and transferring thermal energy from the fluid to the nacelle; and/or a further embodiment of the foregoing methods can further comprise reducing the build-up of ice on the nacelle in response to transferring thermal energy from the fluid; and/or a further embodiment of the foregoing methods can further comprise transferring fluid out of the first valve, adjusting a pressure in an internal chamber of a second valve in response to the changed pressure of the fluid exiting the first valve, adjusting the second valve in response to the adjusted pressure in the internal chamber of the second valve, and altering a flow of the fluid out of the second valve as a function of the adjusted second valve.

A fluid pressure regulation system can include a first valve, second valve, and an anti-icing system for a nacelle inlet of an aircraft engine. The first valve can include an inlet, an outlet, and a biasing element. The biasing element can include a first spring element, a second spring element, and a valve element. The second spring element can include at least one curved bimetallic disk including first and second metallic materials. The first metallic material can be on a concave side of the at least one curved bimetallic disk. The second metallic material can be on a convex side of the at least one curved bimetallic disk. The first metallic material can have a first coefficient of linear thermal expansion greater than a second coefficient of linear thermal expansion of the second material. The valve element can be disposed on a second end of the biasing element. The screw can be connected to at least one of the biasing element and the first valve. The anti-icing system can be fluidly connected to the second valve.

The fluid pressure regulation system of the preceding paragraph can optionally include, additionally and/or alternatively, any one or more of the following features, configurations and/or additional components:

a further embodiment of the foregoing fluid pressure regulation system, wherein the second spring element can comprise a plurality of curved bimetallic disks;

a further embodiment of the foregoing fluid pressure regulation systems, wherein the plurality of curved bimetallic disks can comprise curved bimetallic disks facing in opposite directions; and/or a further embodiment of the foregoing fluid pressure regulation systems, wherein the second valve can include a valve element.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of adjusting a fluid pressure regulation system with a first valve and a second valve, the method comprising:
    directing a fluid into the first valve;
    passing the fluid over a biasing element in the first valve;
    transferring thermal energy either from the fluid to at least one bimetallic disk disposed in the biasing element or to the fluid from the at least one bimetallic disk, wherein the at least one bimetallic disk comprises a first metallic material on a concave side of the at least one bimetallic disk and a second metallic material on a convex side of the at least one bimetallic disk, further wherein the first metallic material has a first coefficient of linear thermal expansion greater than a second coefficient of linear thermal expansion of the second metallic material;
    altering the curvature of the at least one bimetallic disk in response to a change in temperature of the fluid;
    changing a spring force of the biasing element as a function of the altered curvature of the at least one bimetallic disk;
    changing a pressure of the fluid exiting the first valve as a function of the changed spring force of the biasing element;
    transferring fluid from the first valve to the second valve;
    adjusting the second valve in response to the change in pressure of the fluid exiting the first valve;
    altering a flow of the fluid out of the second valve as a function of the adjusted second valve;
    transferring fluid from the second valve to a nacelle of an aircraft engine; and
    transferring thermal energy from the fluid to the nacelle.

2. The method of claim 1, the method further comprising:
    transferring thermal energy from the fluid to each of the bimetallic disks;
    decreasing the curvature of each of the bimetallic disks;
    decreasing the spring force of the biasing element; and
    increasing the pressure of the fluid exiting the first valve.

3. The method of claim 1, the method further comprising:
    transferring thermal energy to the fluid from each of the bimetallic disks;
    increasing the curvature of each of the bimetallic disks;
    increasing the spring force of the biasing element; and
    decreasing the pressure of the fluid exiting the first valve.

4. The method of claim 1, wherein adjusting the second valve further comprises actuating a valve element disposed within the second valve.

5. The method of claim 1, the method further comprising:
    reducing the build-up of ice on the nacelle in response to transferring thermal energy from the fluid.

6. The method of claim 1, the method further comprising:
    adjusting a pressure in an internal chamber of the second valve in response to the changed pressure of the fluid exiting the first valve;
    adjusting the second valve in response to the adjusted pressure in the internal chamber of the second valve.

* * * * *